(12) United States Patent
Arase et al.

(10) Patent No.: US 8,844,297 B2
(45) Date of Patent: Sep. 30, 2014

(54) GAS TURBINE AND METHOD FOR MAINTAINING AND INSPECTING THE SAME

(75) Inventors: Kenichi Arase, Hyogo-ken (JP); Yasuro Sakamoto, Hyogo-ken (JP); Shinya Hashimoto, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1071 days.

(21) Appl. No.: 12/919,434

(22) PCT Filed: Jan. 8, 2009

(86) PCT No.: PCT/JP2009/050158
§ 371 (c)(1),
(2), (4) Date: Aug. 25, 2010

(87) PCT Pub. No.: WO2009/107410
PCT Pub. Date: Sep. 3, 2009

(65) Prior Publication Data
US 2011/0006546 A1     Jan. 13, 2011

(30) Foreign Application Priority Data
Feb. 28, 2008   (JP) ................................ 2008-048248

(51) Int. Cl.
*F02C 7/20* (2006.01)
*F02C 7/04* (2006.01)
*F01D 25/28* (2006.01)
*F01D 15/10* (2006.01)
*F01D 25/00* (2006.01)

(52) U.S. Cl.
CPC . *F01D 25/28* (2013.01); *F02C 7/04* (2013.01); *F01D 25/285* (2013.01); *F05D 2230/70* (2013.01); *F01D 15/10* (2013.01); *F05D 2230/80* (2013.01); *F01D 25/00* (2013.01)

USPC ............................................. 60/798; 60/796

(58) Field of Classification Search
USPC ........................... 60/796–798, 801; 137/15.1
See application file for complete search history.

(56) References Cited

U.S. PATENT DOCUMENTS 2,443,054 A * 6/1948 Putz et al. ...................... 60/797
2,550,580 A * 4/1951 McLeod et al. ................. 464/97
(Continued)

FOREIGN PATENT DOCUMENTS

| GB | 2047811 A | 12/1980 |
|---|---|---|
| JP | 60-062621 A | 4/1985 |

(Continued)

OTHER PUBLICATIONS

Extended European Search Report for corresponding European Patent Application No. 09715196.3 completed Mar. 8, 2013.

(Continued)

*Primary Examiner* — Stephen M Hepperle
*Assistant Examiner* — Umashankar Venkatesan
(74) *Attorney, Agent, or Firm* — Lowe Hauptman & Ham, LLP (57) ABSTRACT

A gas turbine includes a gas turbine body in which a rotor is rotated with the energy of combustion gas produced by combustion of fuel to take out rotational energy from the rotor, an inlet casing that is attached to the gas turbine body and that guides the air to a compressor section compressing the air, an air intake chamber that is connected to the inlet casing and that guides the air taken in from the atmosphere to the gas turbine body, and a notch so formed in the air intake chamber as to cover the entire range where the rotor passes or exists when the rotor is moved.

7 Claims, 6 Drawing Sheets

(56) References Cited

U.S. PATENT DOCUMENTS

| | | | | |
|---|---|---|---|---|
| 2,632,997 | A | * | 3/1953 | Howard et al. ............... 60/797 |
| 2,650,753 | A | * | 9/1953 | Howard et al. ............... 415/137 |
| 4,002,023 | A | * | 1/1977 | Hartmann ..................... 60/797 |
| 4,037,404 | A | * | 7/1977 | Bougain ........................ 60/223 |
| 4,044,442 | A | * | 8/1977 | Carlson .................... 29/888.012 |
| 5,383,652 | A | * | 1/1995 | Van Den Berg ............... 269/17 |
| 5,440,874 | A | | 8/1995 | Charier et al. |
| 5,709,529 | A | | 1/1998 | Parzych |
| 6,279,309 | B1 | * | 8/2001 | Lawlor et al. ................. 60/772 |
| 8,272,222 | B2 | * | 9/2012 | Zhang et al. .................. 60/785 |
| 2001/0003242 | A1 | | 6/2001 | Takamatsu et al. |
| 2002/0023424 | A1 | | 2/2002 | Takamatsu et al. |
| 2003/0061796 | A1 | * | 4/2003 | Kaijima et al. ............. 60/39.182 |
| 2007/0059159 | A1 | * | 3/2007 | Hjerpe ......................... 415/117 |
| 2010/0095683 | A1 | * | 4/2010 | Glynn et al. ................... 60/796 |

FOREIGN PATENT DOCUMENTS

| | | |
|---|---|---|
| JP | 62-054246 U | 4/1987 |
| JP | 05-118201 A | 5/1993 |
| JP | 05-052235 U | 7/1993 |
| JP | 07-010440 U | 2/1995 |
| JP | 11-062621 A | 3/1999 |
| JP | 2000-502776 A | 3/2000 |
| JP | 2000-282807 A | 10/2000 |
| JP | 2001-107745 A | 4/2001 |
| JP | 2002-047947 A | 2/2002 |
| JP | 2002147248 A | 5/2002 |
| JP | 2002-180849 A | 6/2002 |

OTHER PUBLICATIONS

Notice of Allowance corresponding to KR10-2010-7018755, dated Sep. 17, 2012.
Office Action and Search Report corresponding to CN200980106938.9, dated Sep. 19, 2012.
Japanese Office Action dated Oct. 25, 2011 in the corresponding Japanese Patent Application No. 2008-048248 with translation.
ISR for PCT/JP2009/050158 mailed Feb. 24, 2009.
Decision of Patent Grant corresponding to JP2008-048248, dated May 15, 2012.
Notification of Grant of Invention Patent Right mailed Feb. 18, 2014, corresponds Chinese patent application No. 200980106938.9.

* cited by examiner

GAS TURBINE AND METHOD FOR MAINTAINING AND INSPECTING THE SAME

RELATED APPLICATIONS

The present application is based on International Application Number PCT/JP2009/050158, filed Jan. 8, 2009, and claims priority from, Japanese Application Number 2008-048248, filed Feb. 28, 2008.

TECHNICAL FIELD

The present invention relates to a gas turbine and a method for maintaining and inspecting the same, and more particularly, to a gas turbine whose body is lifted in maintenance and inspection and a method for maintaining and inspecting the same.

BACKGROUND ART

Apparatuses conventionally used to take energy out of combustion gas produced by combustion of fuel include gas turbines. In gas turbines, for example, the turbines are rotated with the energy of combustion gas produced by combustion with compressed air supplied to combustion, thereby causing a rotor to output rotational energy.

For example, Patent Document 1 discloses a gas turbine with a rotor for high-speed rotation including a thrust bearing collar in an overhang provided outside a bearing span. The rotor is so configured that no shaft extends outside of the thrust bearing collar and the shaft of the overhang is made hollow, thereby simplifying the vibration properties of the rotor at a rated speed and facilitating balancing.

Patent Document 1: Japanese Patent Application Laid-open No. H5-118201

DISCLOSURE OF INVENTION

Problem to be Solved by the Invention

In general, a gas turbine is lifted by a crane in maintenance and inspection of the gas turbine, for example. This operation usually requires lifting of an air duct through which the air is supplied to a gas turbine body by the crane. Therefore, the work of maintenance and inspection of the gas turbine can be complicated. In addition, because the air duct is lifted by the crane, a facility required for maintenance and inspection of the gas turbine can be large in size. The technology disclosed in Patent Document 1 takes vibration properties into consideration, but pays no attention to maintenance and inspection of gas turbines in this regard.

The present invention has been made in view of the foregoing, and has an object to enable maintenance and inspection of a gas turbine without lifting of an air duct.

Means for Solving Problem

According to an aspect of the present invention, a gas turbine includes: a gas turbine body in which a rotating body is rotated with energy of combustion gas produced by combustion of fuel to take out rotational energy from the rotating body; an air intake member that is attached to the gas turbine body and that guides the air to a compressor section compressing the air; and an air intake chamber that is configured to prevent interference with the rotating body when the rotating body is moved and that is connected to the air intake member and guides the air taken in from atmosphere to the compressor section.

With this configuration, in the gas turbine according to the present invention, when the rotating body is moved, for example, when the gas turbine undergoes maintenance and inspection, the rotating body does not interfere with the air intake chamber. Therefore, in the gas turbine, when the gas turbine undergoes maintenance and inspection, the air duct does not need to be lifted and moved by a crane, for example.

Advantageously, in the gas turbine, the air intake chamber has an opening so formed in the air intake chamber as to cover an entire range where the rotating body passes or exists when the rotating body is moved.

With this configuration, in the gas turbine according to the present invention, when the rotating body is moved, for example, when the gas turbine undergoes maintenance and inspection, the rotating body does not interfere with the air intake chamber. Therefore, in the gas turbine, when the gas turbine undergoes maintenance and inspection, the air intake chamber does not need to be lifted and moved by a crane, for example.

When the air duct is lifted by the crane, the air duct needs to be stored in a building that houses therein the crane. By contrast, the gas turbine requires no lifting of the air duct by the crane in maintenance and inspection. Therefore, the gas turbine eliminates the need for storage of the air duct in the building. Consequently, with the gas turbine, the size of the building that houses therein the gas turbine body is reduced.

Advantageously, the gas turbine further includes: a generator input shaft that is detachably and directly connected to the rotating body; and a generator that generates electric power based on rotation of the generator input shaft.

With this configuration, in the gas turbine according to the present invention, in maintenance and inspection, the generator is removed from the rotating body. Thus, in the gas turbine, the number of elements to be moved in maintenance and inspection can be reduced. Therefore, in the gas turbine, movement of the rotating body in maintenance and inspection is facilitated.

Advantageously, the gas turbine further includes: a generator input shaft that is detachably connected to the rotating body through an intermediate shaft; and a generator that generates electric power based on rotation of the generator input shaft.

With this configuration, in the gas turbine according to the present invention, in maintenance and inspection, the intermediate shaft is removed. Accordingly, the rotating body is removed from the generator. The generator and the rotating body are spaced apart by a certain distance. Therefore, in the gas turbine, the rotating body and the generator are connected to each other through the intermediate shaft, whereby the length of a part of the rotating body connected to the generator can be shortened. Consequently, in the gas turbine, the travel distance of the rotating body in maintenance and inspection can be shortened.

Advantageously, in the gas turbine, the intermediate shaft is formed with a hole.

In general, the smaller the mass of a member is, the more vibrations accompanying its rotation are reduced under the same mass balance. In the gas turbine according to the present invention, the intermediate shaft is formed with the hole. Accordingly, the mass of the intermediate shaft is reduced. Therefore, in the gas turbine, vibrations accompanying the transmission of rotation of the rotating body to the generator can be reduced.

Advantageously, the gas turbine further includes a cover that is detachably provided to the opening to cover the opening formed in the air intake chamber.

With this configuration, in the gas turbine, the flow of the air leaking out of the opening can be reduced.

According to another aspect of the present invention, a method for maintaining and inspecting a gas turbine configured to include a gas turbine body in which a rotating body is rotated with energy of combustion gas produced by combustion of fuel to take out rotational energy from the rotating body, an air intake chamber that is configured to prevent interference with the rotating body when the rotating body is moved and that is connected to the air intake member and guides the air taken in from atmosphere to the compressor section, an air intake member that is detachably connected to the air intake chamber and that guides the air to the compressor section compressing the air, an opening so formed in the air intake chamber as to cover an entire range where the rotating body passes or exists when the rotating body is moved, a generator input shaft that is detachably connected to the rotating body and to which rotation of the rotating body is transmitted, a generator that generates electric power based on rotation of the generator input shaft, and a cover that is detachably provided to the opening to cover the opening, the method includes: removing the cover; removing the air intake member from the air intake chamber; removing the generator input shaft from the rotating body; and moving the rotating body in a direction away from a ground on which the gas turbine is placed.

With this configuration, in the method for maintaining and inspecting a gas turbine according to the present invention, when the rotating body is moved, for example, when the gas turbine undergoes maintenance and inspection, the gas turbine body and the opening formed in the air intake chamber do not interfere with each other. Therefore, in the method for maintaining and inspecting a gas turbine, when the gas turbine body undergoes maintenance and inspection, the air duct does not need to be lifted and moved by a crane, for example.

If the air duct is lifted by the crane, the air duct needs to be stored in a building that houses therein the crane. By contrast, the method for maintaining and inspecting a gas turbine requires no lifting of the air duct by the crane in maintenance and inspection. Therefore, the method for maintaining and inspecting a gas turbine eliminates the need for storage of the air duct in the building. Consequently, in the method for maintaining and inspecting a gas turbine, the size of the building that houses therein the gas turbine body can be reduced.

Effect of the Invention

The present invention enables maintenance and inspection of a gas turbine body without lifting of an air duct.

EXPLANATIONS OF LETTERS OR NUMERALS 1, 2 gas turbine
10 rotor
20 jack shaft
30, 230 air duct
31 air intake chamber
32 air duct air intake section
33 air intake chamber opening
34 notch
35 cover
36 air cleaner
40, 240 building
50 crane
60 generator
61 generator input shaft
100 gas turbine body
110 turbine section
111 turbine section casing
112 turbine section nozzle
113 turbine section rotor blade
114 disk
120 compressor section
121 inlet casing
122 compressor section casing
123 compressor section vane
124 compressor section rotor blade
130 combustor section
140 exhaust section
141 exhaust diffuser
151, 152 bearing
GND ground

BEST MODE(S) FOR CARRYING OUT THE INVENTION

The present invention will now be explained in detail with reference to the drawings. The present invention is not limited to the best modes for carrying out the invention (hereinafter, "embodiments"). Elements described in the embodiments below include elements readily thought of by those skilled in the art, substantially the same elements, and elements that fall within the scope of so-called equivalents.

Figure 1:
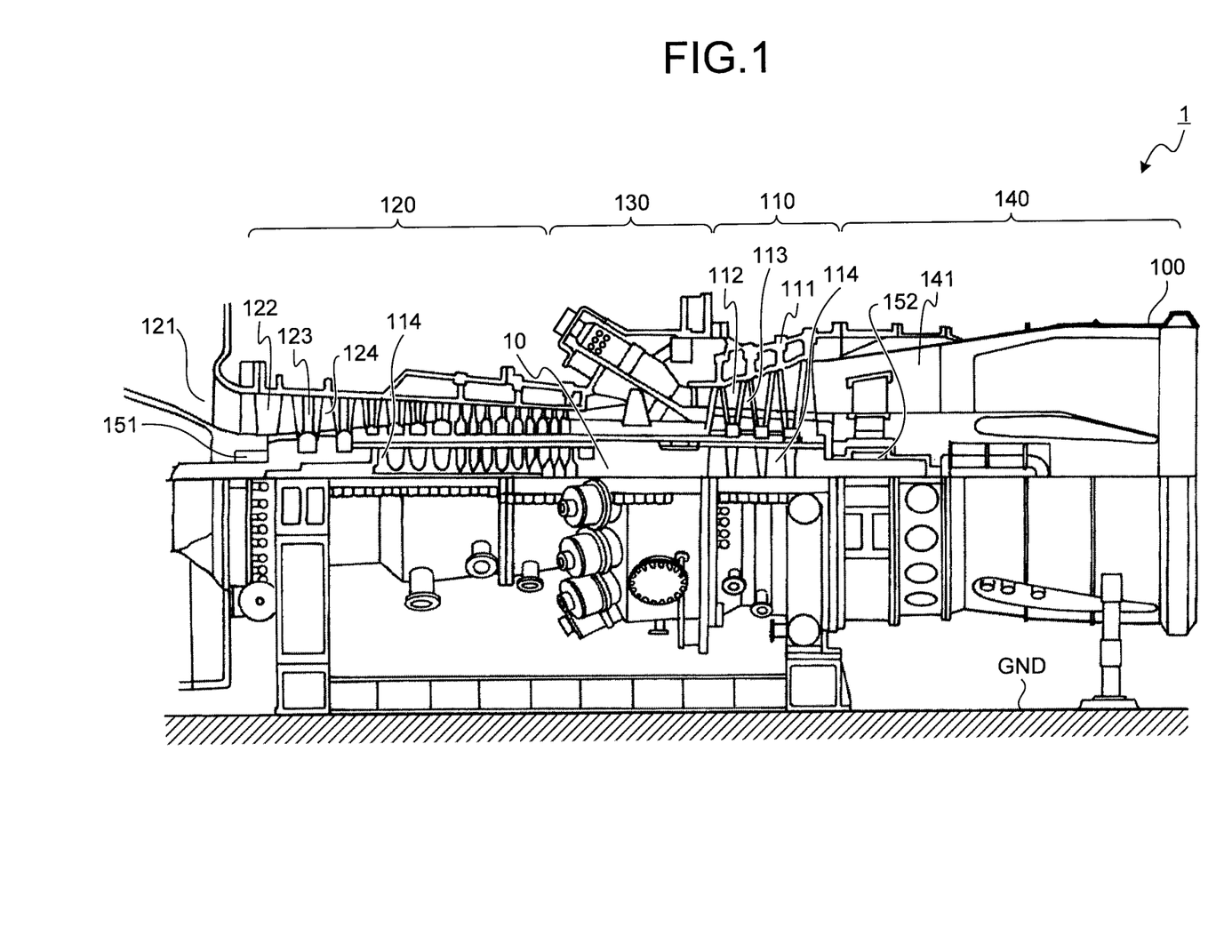
FIG. 1 is a schematic of a configuration of a gas turbine according to an embodiment.

FIG. 1 is a schematic of a configuration of a gas turbine according to the present embodiment. A gas turbine body 100 according to the present embodiment is a core element of a gas turbine 1. As illustrated in FIG. 1, the gas turbine body 100 is placed on a ground GND. The gas turbine body 100 is configured to include, from the upstream side to the downstream side of the flow of a fluid, a compressor section 120, a combustor section 130, a turbine section 110, and an exhaust section 140.

The compressor section 120 compresses the air and sends the compressed air to the combustor section 130. The combustor section 130 supplies fuel to the compressed air. The combustor section 130 then burns the fuel. The turbine section 110 converts the energy of the combustion gas sent by the combustor section 130 into rotational energy. The exhaust section 140 discharges the combustion gas into the atmosphere.

The compressor section 120 is configured to include an inlet casing 121 as an air inlet member, a compressor section casing 122, a compressor section vane 123, and a compressor section rotor blade 124. The inlet casing 121 takes the air from the atmosphere into the compressor section casing 122. A plurality of such compressor section vanes 123 and a plurality of such compressor section rotor blades 124 are arranged alternately in the compressor section casing 122.

The turbine section 110 is configured to include a turbine section casing 111, a turbine section nozzle 112, and a turbine section rotor blade 113. A plurality of such turbine section nozzles 112 and a plurality of such turbine section rotor blades 113 are arranged alternately in the turbine section casing 111. The exhaust section 140 has an exhaust diffuser 141 communicating with the turbine section 110. The exhaust diffuser 141 converts the dynamic pressure of exhaust gas that has passed the turbine section 110 into static pressure.

The gas turbine body 100 has a rotor 10 as a rotating body. The rotor 10 is provided to penetrate the central areas of the compressor section 120, the combustor section 130, the turbine section 110, and the exhaust section 140. The rotor 10 has one end on the compressor section 120 side rotatably supported by a bearing 151, and the other end on the exhaust section 140 side rotatably supported by a bearing 152.

To the rotor 10, a plurality of disks 114 is fixed. To the disks 114, the compressor section rotor blades 124 and the turbine section rotor blades 113 are connected. The end of the rotor 10 on the compressor section 120 side is connected to a generator input shaft 61 in a generator 60 illustrated in FIG. 2. The configuration of the connecting part between the rotor 10 and the generator 60 will be described in detail later.

The gas turbine body 100 first takes in the air through the inlet casing 121 in the compressor section 120. The air thus taken in is compressed by the compressor section vanes 123 and the compressor section rotor blades 124. Consequently, the air becomes high-temperature, high-pressure compressed air. Subsequently, the combustor section 130 supplies a given fuel to the compressed air to burn the fuel.

Subsequently, the turbine section nozzles 112 and the turbine section rotor blades 113 that constitute the turbine section 110 convert the energy of high-temperature, high-pressure combustion gas produced by the combustor section 130 into rotational energy. The turbine section rotor blades 113 transmit the rotational energy to the rotor 10, whereby the rotor 10 rotates.

Figure 2:
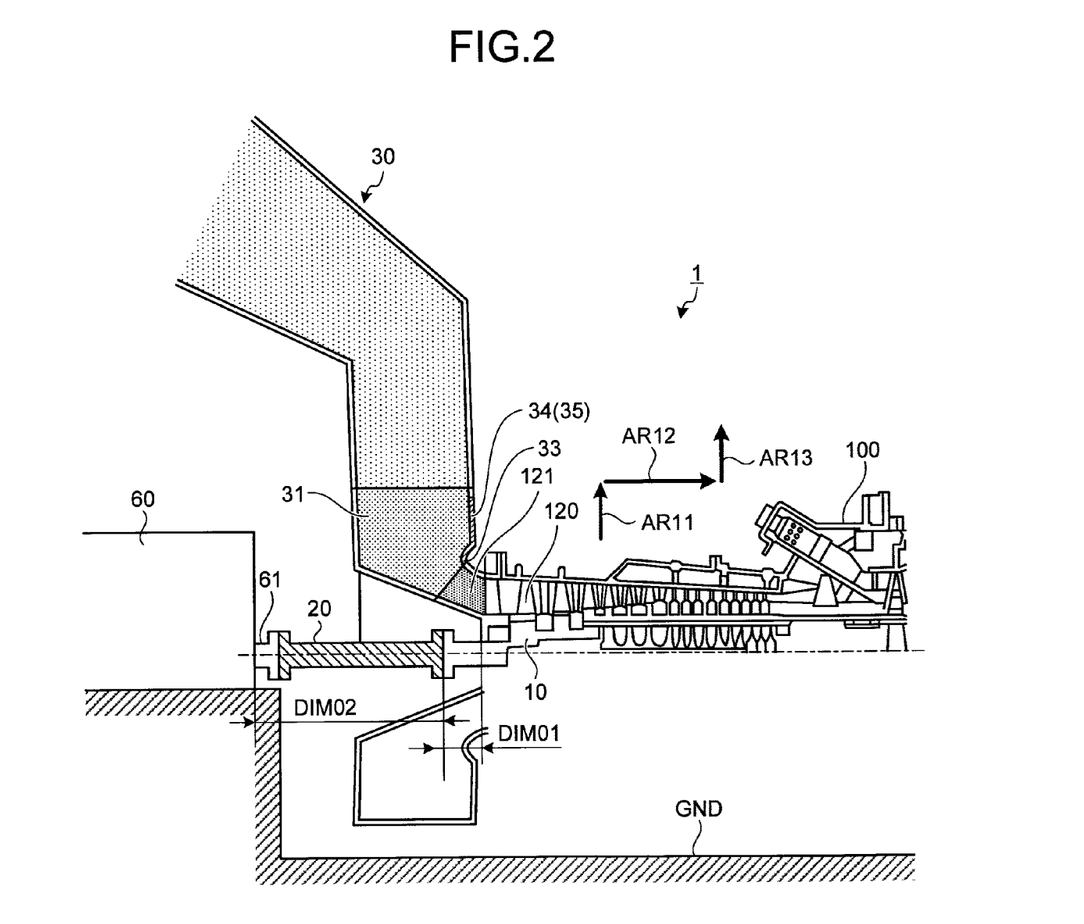
FIG. 2 is a schematic of a configuration of a connecting part and periphery thereof between a gas turbine body according to the present embodiment and a generator.

With this configuration, the gas turbine body 100 drives the generator 60 connected to the rotor 10 and illustrated in FIG. 2. Exhaust gas that has passed the turbine section 110 has its dynamic pressure converted by the exhaust diffuser 141 in the exhaust section 140 into static pressure, and is then released into the atmosphere.

Figure 3:
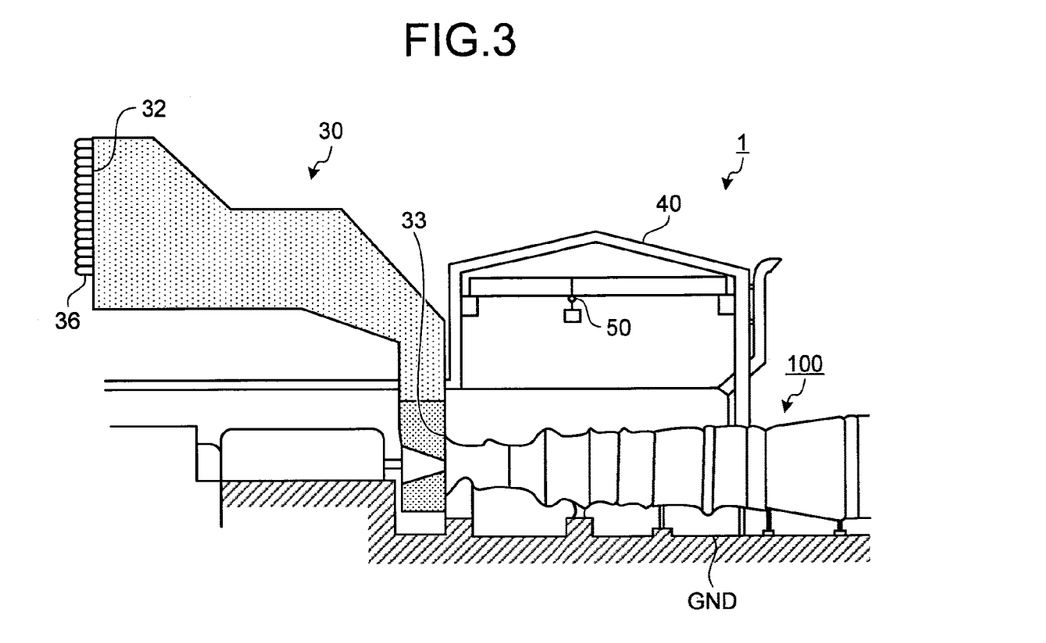
FIG. 3 is a schematic of the entire configuration of the gas turbine according to the present embodiment.

FIG. 2 is a schematic of a configuration of a connecting part and periphery thereof between the gas turbine body according to the present embodiment and the generator. FIG. 3 is a schematic of the entire configuration of the gas turbine according to the present embodiment.

The gas turbine 1 has a jackshaft 20 as an intermediate shaft as illustrated in FIG. 2. The jackshaft 20 has one end detachably connected to the generator input shaft 61 in the generator 60. The jackshaft 20 has the other end detachably connected to the rotor 10. In other words, the jackshaft 20 directly connects the generator input shaft 61 and the rotor 10. The jackshaft 20 thus transmits rotation of the rotor 10 to the generator 60.

The jackshaft 20 is formed in a substantially cylindrical shape, for example. In other words, the jackshaft 20 is formed with a penetrating hole in its axial direction. Accordingly, the mass of the jackshaft 20 is reduced. Note that the smaller the mass of a rotating body is, the more vibrations accompanying its rotation are reduced under the same mass balance. Therefore, with the jackshaft 20, vibrations accompanying the transmission of the rotation of the rotor 10 to the generator 60 are reduced.

The penetrating hole is not necessarily formed in the axial direction. The jackshaft 20 may have a non-penetrating hole, instead of the penetrating hole. In this case as well, the mass of the jackshaft 20 is reduced. Therefore, with the jackshaft 20, vibrations accompanying the transmission of the rotation of the rotor 10 to the generator 60 are reduced.

An air duct 30 is, for example, connected to the inlet casing 121 in the gas turbine body 100 through an air intake chamber 31. The air duct 30 has, as illustrated in FIG. 3, an air duct air intake section 32. The air duct air intake section 32 is open to the atmosphere outside a building 40 that houses therein the gas turbine body 100. To the air duct air intake section 32, an air cleaner 36 that removes dust in the air is provided.

The air intake chamber 31 has one opening connected to the air duct 30 and the other opening connected to the inlet casing 121. Accordingly, the air intake chamber 31 guides the air inside the air duct 30 to the inlet casing 121. The air intake chamber 31 has an air intake chamber opening 33. The air intake chamber 31 is arranged between the generator 60 and the gas turbine body 100. The air intake chamber opening 33 is an opening for making the rotor 10 penetrate the air intake chamber 31.

The inlet casing 121 has one opening connected to the air intake chamber 31 and the other end connected to the compressor section 120 in the gas turbine body 100. The inlet casing 121 is connected detachably from the air intake chamber 31 and the compressor section 120 in the gas turbine body 100. With this configuration, the air taken in through the air duct air intake section 32 is guided to the air intake chamber 31 through the air duct 30. The air guided to the air intake chamber 31 is supplied to the compressor section 120 in the gas turbine body 100 through the inlet casing 121.

Figure 4:
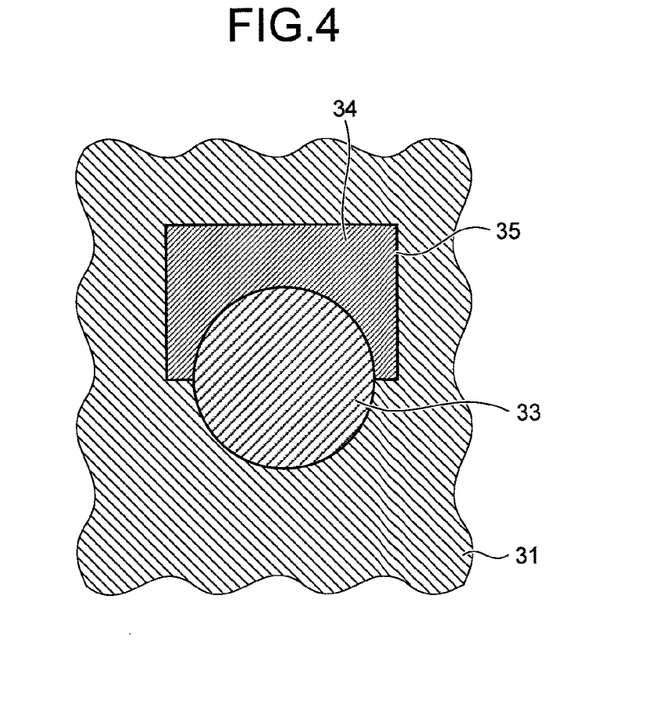
FIG. 4 is a schematic of an air intake chamber according to the present embodiment seen from the gas turbine side.

FIG. 4 is a schematic of the air intake chamber according to the present embodiment seen from the gas turbine side. As illustrated in FIG. 4, the air intake chamber 31 is formed with a notch 34 as an opening. The notch 34 is formed on the wall surface that constitutes the air intake chamber 31. The notch 34 includes the air intake chamber opening 33, and is formed on the wall surface on the air duct 30 side of the air intake chamber opening 33. In the present embodiment, the notch 34 is rectangular but has its portion on the air intake chamber opening 33 side cut in an arcuate form.

To the notch 34, a cover 35 is provided. The cover 35 is provided to closely cover the notch 34. The cover 35 thus maintains air-tightness in the air intake chamber 31. If the cover 35 is removed, the notch 34 communicates with the air intake chamber opening 33, thereby forming an opening.

The rotor 10 in the gas turbine body 100 illustrated in FIG. 2 is, in maintenance and inspection, lifted from the ground GND and moved by a crane 50 illustrated in FIG. 3. In maintenance and inspection of the gas turbine body 100, the cover 35 is removed, whereby the notch 34 appears. The notch 34 is provided to avoid contact between the rotor 10 and the air intake chamber 31 when the rotor 10 is lifted and moved by the crane 50. As a result, during the lifting of the rotor 10, the distance by which the crane is moved in the horizontal direction is small.

The notch 34 is formed, for example, at one point in the air intake chamber 31, but the present embodiment is not limited thereto. The notch 34 may be formed at a plurality of points in the air intake chamber 31. In other words, in the gas turbine 1, an opening is formed sufficiently as long as it is formed in all the portions included in a range where the rotor 10 passes or exists when the rotor 10 is lifted and moved by the crane 50.

In the gas turbine 1, in maintenance and inspection, first the cover 35 is removed from the air intake chamber 31. Subsequently, in the gas turbine 1, the inlet casing 121 is removed from the air intake chamber 31 and the compressor section 120 in the gas turbine body 100. Then, in the gas turbine 1, the jackshaft 20 is removed from the rotor 10.

Subsequently, in the gas turbine 1, the rotor 10 illustrated in FIG. 2 is lifted in a direction away from the ground GND as an arrow AR11 indicates by the crane 50 illustrated in FIG. 3. At this point, the inlet casing 121 and the cover 35 have been already removed from the air intake chamber 31 as mentioned above. Therefore, the rotor 10 does not interfere with the air intake chamber 31.

Then, as the rotor 10 leaves the ground GND, in the gas turbine 1, the rotor 10 is moved in a direction away from the air intake chamber 31 as an arrow AR12 indicates. In this operation, the rotor 10 is moved to a position where its end on the jackshaft 20 side does not interfere with the air intake chamber 31 when the rotor 10 further moves in the direction away from the ground GND. In other words, the rotor 10 is moved to a position where its end on the jackshaft 20 side does not correspond to the air intake chamber 31 in the vertical direction.

A distance DIM01 represents a distance from a virtual plane that passes through a part of the air intake chamber 31 closest to the inlet casing 121 side within the range of movement of the rotor 10 in the direction away from the ground GND as the arrow AR11 indicates and that is perpendicular to the ground GND, to the end of the rotor 10 on the generator 60 side.

The rotor 10 moves in the direction away from the air intake chamber 31 as the arrow AR12 indicates by the distance DIM01 or more. In other words, the smaller the distance DIM01 is, the more the travel distance of the rotor 10 by the crane 50 illustrated in FIG. 3 is shortened in the gas turbine 1.

In the gas turbine 1, the rotor 10 and the generator input shaft 61 are connected through the jackshaft 20 that is detachable as described above. Therefore, in the gas turbine 1, the distance DIM01 is shortened if the distance between the gas turbine body 100 and the generator 60 is constant compared with a case where the rotor 10 is connected to the generator input shaft 61 without the jackshaft 20 interposed therebetween.

Consequently, in the gas turbine 1, the travel distance of the rotor 10 by the crane 50 illustrated in FIG. 3 is shortened. As a result, with the gas turbine 1, work time and operators' workload for maintenance and inspection can be reduced. In the gas turbine 1, because the travel distance of the crane 50 is shortened, a rail for the crane 50 is made compact. As a result, with the gas turbine 1, the building 40 housing therein the crane 50 and illustrated in FIG. 3 is made compact.

In the gas turbine 1, the distance between the gas turbine body 100 and the generator 60 is preferably set small. In this manner, in the gas turbine 1, the size of the distance DIM01 can be further reduced. Therefore, in the gas turbine 1, the travel distance of the rotor 10 by the crane 50 illustrated in FIG. 3 is shortened more desirably. Consequently, with the gas turbine 1, work time and operators' workload for maintenance and inspection can be further reduced. In the gas turbine 1, because the travel distance of the crane 50 is shortened, the rail for the crane 50 is made further compact. As a result, with the gas turbine 1, the building 40 housing therein the crane 50 and illustrated in FIG. 3 is made compact.

When the rotor 10 is moved in the direction away from the air intake chamber 31 as the arrow AR12 indicates, in the gas turbine 1, the rotor 10 is moved in a direction away from the ground GND as an arrow AR13 indicates. In this operation, the rotor 10 is moved in the direction away from the ground GND up to a height that is necessary to undergo maintenance and inspection.

Figure 5:
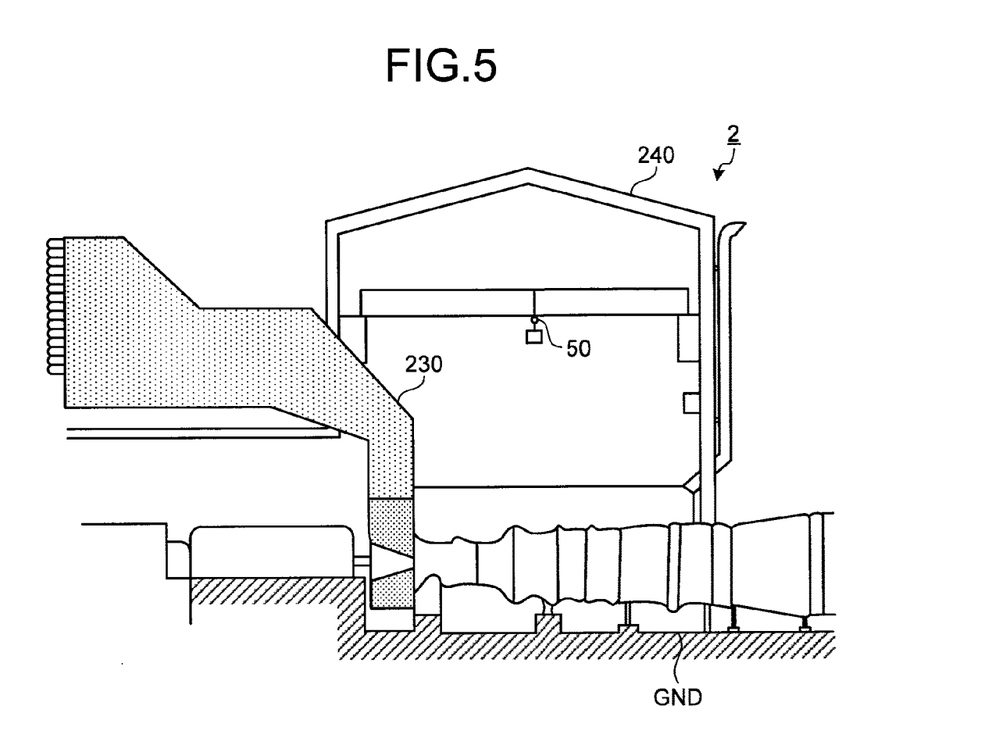
FIG. 5 is a schematic of the entire configuration of a conventional gas turbine.

FIG. 5 is a schematic of the entire configuration of a conventional gas turbine. In a conventional gas turbine 2 illustrated in FIG. 5, in maintenance and inspection, an air duct 230 is lifted and removed by the crane 50 before a rotor is lifted by the crane 50. For this reason, at least a part of the air duct 230 to be removed needs to be housed in a building 240 where the crane 50 exists.

To lift the air duct 230, the crane 50 needs to be placed at a higher level from the ground GND than the part of the air duct 230 to be removed. For this reason, the building 240 illustrated in FIG. 5 can be larger in size than the building 40 illustrated in FIG. 3.

By contrast, in the gas turbine 1, the air duct 30 and the air intake chamber 31 are not lifted by the crane in maintenance and inspection as described above. Therefore, the crane 50 provided in the building 40 that houses therein the gas turbine body 100 is provided sufficiently to a higher level at least than the gas turbine body 100. Thus, in the gas turbine 1, the height of the building 40 that houses therein the gas turbine body 100 from the ground GND to the ceiling is reduced.

In the gas turbine 1, the air duct 30 is not moved even in maintenance and inspection. Therefore, with the gas turbine 1, the air duct 30 can be provided outside the building 40. Accordingly, with the gas turbine 1, the size of the building 40 that houses therein the gas turbine body 100 is reduced.

In the gas turbine 1, because the air duct 30 is not removed, the time required for maintenance and inspection is reduced. In addition, with the gas turbine 1, the workload of operators involved in the work of maintenance and inspection of the gas turbine body 100 can be reduced.

Figure 6:
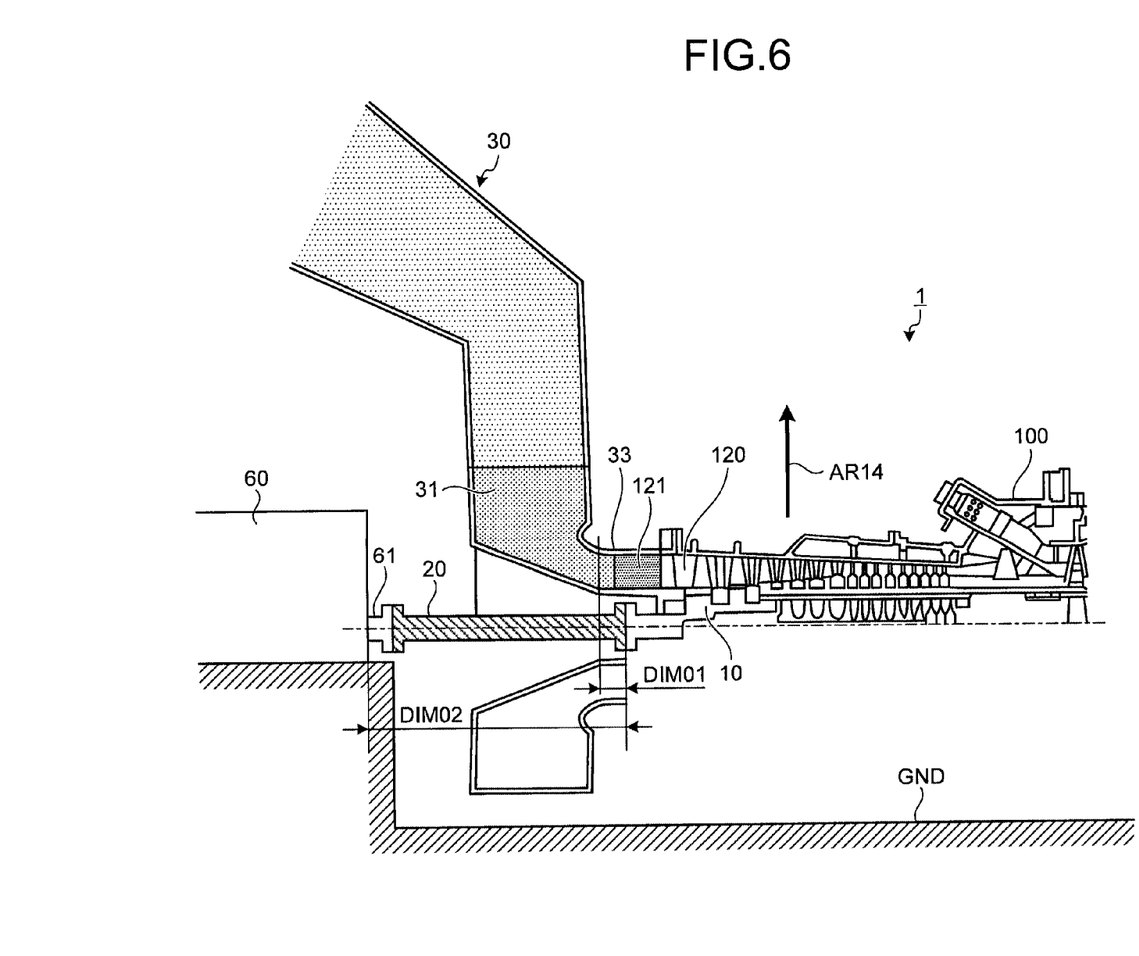
FIG. 6 is a schematic of an alternative configuration of the connecting part and periphery thereof between the gas turbine body according to the present embodiment and the generator.

FIG. 6 is a schematic of an alternative configuration of the connecting part and periphery thereof between the gas turbine body according to the present embodiment and the generator. The connecting part between the rotor 10 and the jackshaft 20 may be located, as illustrated in FIG. 6, in an area opposite to the generator 60 with respect to the virtual plane as a reference that passes through a part of the air intake chamber 31 closest to the inlet casing 121 side within the range of movement of the rotor 10 in a direction away from the ground GND and that is perpendicular to the ground GND. Specifically, the connecting part between the rotor 10 and the jackshaft 20 is provided in a position that does not correspond to the air intake chamber 31 in the vertical direction. In other words, supposing that the distance DIM01 illustrated in FIG. 2 is a positive value, the DIM01 illustrated in FIG. 6 is a negative value.

In this case, when the gas turbine 1 undergoes maintenance and inspection, the rotor 10 is moved only in a direction away from the ground GND as an arrow AR14 indicates. In this operation, the rotor 10 is moved in the direction away from the ground GND up to a height that is necessary to undergo maintenance and inspection. In this manner, in the gas turbine 1, the rotor 10 is not moved in a direction away from the air intake chamber 31.

Consequently, in the gas turbine 1, the travel distance of the rotor 10 by the crane 50 illustrated in FIG. 3 is shortened. As a result, with the gas turbine 1, work time and operators' workload for maintenance and inspection can be reduced. In the gas turbine 1, because the travel distance of the crane 50 is shortened, the rail for the crane 50 is made compact. As a result, with the gas turbine 1, the building 40 housing therein the crane 50 and illustrated in FIG. 3 is made compact.

Referring to FIGS. 2 and 6, a distance DIM02 represents a distance from a virtual plane that passes through a part of the generator 60 closest to the inlet casing 121 side and that is perpendicular to the ground GND, to the rotor 10. In general, in the gas turbine 1, the distance DIM02 is preferably set small. The smaller the distance DIM02 is, the more vibrations of the rotor 10 are reduced in the gas turbine 1.

However, if the design or the layout of the air duct 30 does not allow reduction in the size of the distance DIM01 while the distance DIM02 is kept constant, in the gas turbine 1, the size of the distance DIM01 and the size of the distance DIM02 are preferably set to such an extent that vibrations of the rotor 10 are allowed. In this manner, in the gas turbine 1, while vibrations of the rotor 10 are reduced, the travel distance of the rotor 10 by the crane 50 illustrated in FIG. 3 is shortened.

In this case, when the rotor 10 is lifted by the crane illustrated in FIG. 3, the rotor 10 does not at all interfere with the air intake chamber 31. Therefore, the air intake chamber 31 does not need to be formed with the notch 34. In addition, the air intake chamber 31 does not need to include the cover 35. Accordingly, the configuration of the gas turbine 1 is simplified and the number of its elements is reduced. Furthermore, with the gas turbine 1, cost required for manufacturing the gas turbine 1 is reduced.

Figure 7:
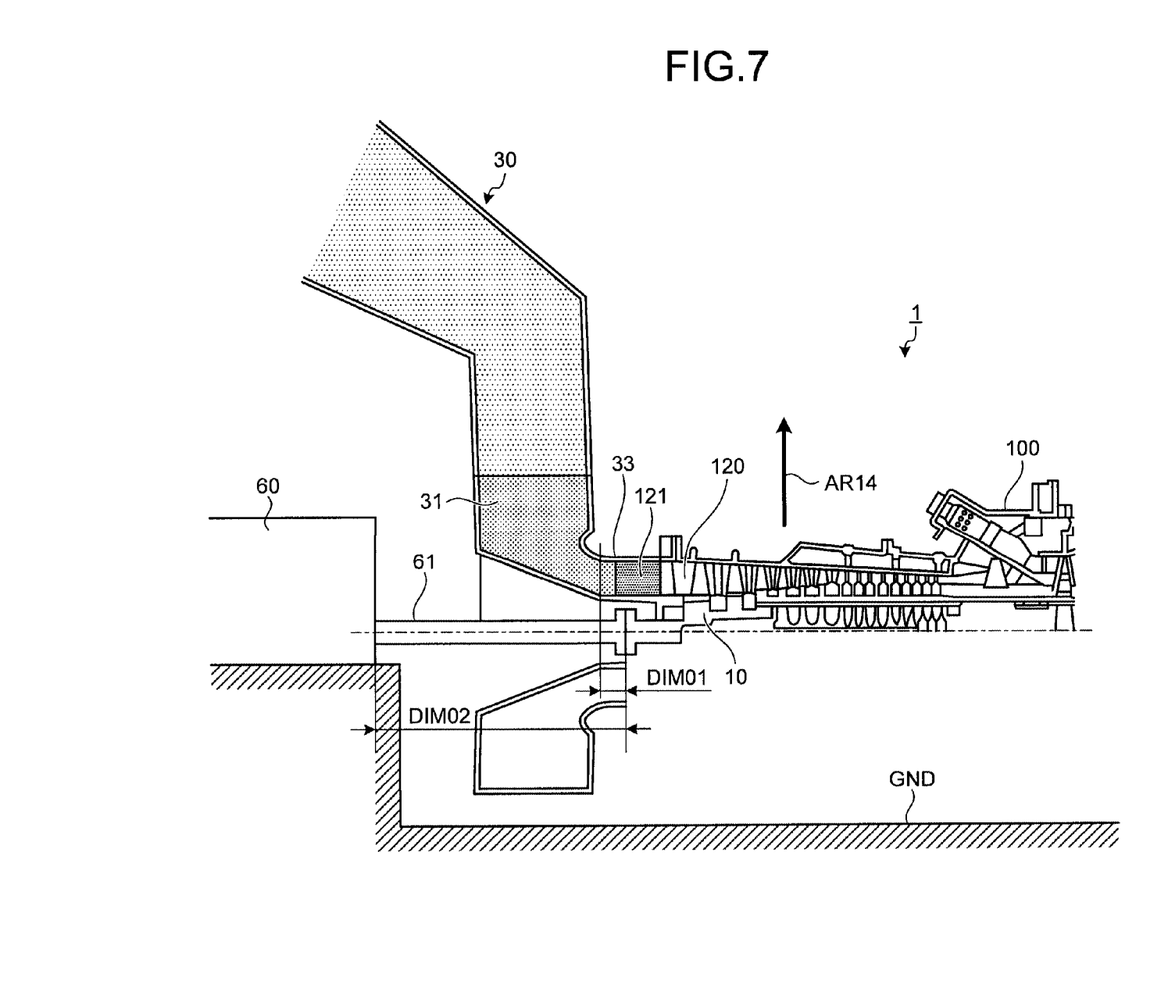
FIG. 7 is a schematic of an alternative configuration of the connecting part and periphery thereof between the gas turbine body according to the present embodiment and the generator.

FIG. 7 is a schematic of an alternative configuration of the connecting part and periphery thereof between the gas turbine body according to the present embodiment and the generator. In the gas turbine 1, for example, as illustrated in FIG. 7, the rotor 10 and the generator input shaft 61 in the generator 60 may be connected directly without the jackshaft 20 interposed therebetween.

Note that the jackshaft 20 is formed with a penetrating hole in its axial direction as described above. Therefore, in the gas turbine 1, the mass of the connecting part between the rotor 10 and the generator input shaft 61 is reduced if the rotor 10 and the generator input shaft 61 are connected through the jackshaft 20 compared with a case where the rotor 10 and the generator input shaft 61 are connected directly. In this manner, in gas turbine 1, vibrations of the rotor 10 are reduced.

In the present embodiment, for example, the generator input shaft 61 is formed with a hole in its axial direction. Thus, in the gas turbine 1, the mass of the connecting part between the rotor 10 and the generator input shaft 61 is reduced without the jackshaft 20.

When the distance DIM02 is constant, in the gas turbine 1, the length of the generator input shaft 61 in its axial direction is preferably set longer. Thus, in the gas turbine 1, the size of the distance DIM01 is reduced.

Consequently, in the gas turbine 1, the travel distance of the rotor 10 by the crane 50 illustrated in FIG. 3 is shortened. Accordingly, with the gas turbine 1, work time and operators' workload for maintenance and inspection can be reduced. In the gas turbine 1, because the travel distance of the crane 50 is shortened, the rail for the crane 50 can be made compact. As a result, with the gas turbine 1, the building 40 housing therein the crane 50 and illustrated in FIG. 3 is made compact.

Industrial Applicability

As described above, the gas turbine according to the present embodiment is useful for a gas turbine whose body is moved in maintenance and inspection, and in particular, useful for a gas turbine that undergoes maintenance and inspection without lifting of an air duct by a crane.

The invention claimed is:

1. A gas turbine comprising:
a gas turbine body in which a rotating body is rotated with energy of combustion gas produced by combustion of fuel to take out rotational energy from the rotating body;
an air intake member that is attached to the gas turbine body and that guides the air to a compressor section compressing the air; and
an air intake chamber that guides the air to the compressor section via the air intake member, wherein
the air intake chamber includes a notch being formed on a wall surface thereof,
the air intake chamber has an opening so formed in the air intake chamber as to cover an entire range where the rotating body passes or exits when the rotating body is moved, and
the gas turbine further comprises a cover that is detachably provided to the opening to cover the opening formed in the air intake chamber.

2. The gas turbine according to claim 1, further comprising:
a generator input shaft that is detachably and directly connected to the rotating body; and
a generator that generates electric power based on rotation of the generator input shaft.

3. The gas turbine according to claim 1, further comprising:
a generator input shaft that is detachably connected to the rotating body through an intermediate shaft; and
a generator that generates electric power based on rotation of the generator input shaft.

4. The gas turbine according to claim 3, wherein the intermediate shaft is formed with a hole.

5. A method for maintaining and inspecting a gas turbine configured to include a gas turbine body in which a rotating body is rotated with energy of combustion gas produced by combustion of fuel to take out rotational energy from the rotating body, an air intake chamber that is configured to prevent interference with the rotating body when the rotating body is moved and that is connected to the air intake member and guides the air taken in from atmosphere to the compressor section, an air intake member that is detachably connected to the air intake chamber and that guides the air to the compressor section compressing the air, an opening so formed in the air intake chamber as to cover an entire range where the rotating body passes or exists when the rotating body is moved, a generator input shaft that is detachably connected to the rotating body and to which rotation of the rotating body is transmitted, a generator that generates electric power based on rotation of the generator input shaft, and a cover that is detachably provided to the opening to cover the opening, the method comprising:
removing the cover;
removing the air intake member from the air intake chamber;
removing the generator input shaft from the rotating body; and
moving the rotating body in a direction away from a ground on which the gas turbine is placed.

6. The gas turbine according claim 1, wherein the wall surface is located on a side from the air intake chamber opening to the air duct.

7. A gas turbine comprising:
a gas turbine body in which a rotating body is rotated with energy of combustion gas produced by combustion of fuel to take out rotational energy from the rotating body;
an air intake member that is attached to the gas turbine body and that guides the air to a compressor section compressing the air; and an air intake chamber that is configured to prevent interference with the rotating body when the rotating body is moved and that is connected to the air intake member and guides the air taken in from atmosphere to the compressor section,
wherein the air intake chamber has an opening so formed in the air intake chamber as to cover an entire range where the rotating body passes or exits when the rotating body is moved, and
wherein the gas turbine further comprises a cover that is detachably provided to the opening to cover the opening formed in the air intake chamber.

* * * * *